(12) United States Patent
Tong

(10) Patent No.: US 11,905,669 B2
(45) Date of Patent: Feb. 20, 2024

(54) VEHICLE RESCUE DEVICE, RESCUE PLATE AND SUPPORT PLATE

(71) Applicant: Ningbo Zhongxin Electronic Technology Co., Ltd., Zhejiang (CN)

(72) Inventor: Mingkui Tong, Zhejiang (CN)

(73) Assignee: Ningbo Zhongxin Electronic Technology Co., Ltd., Zhejiang (CN)

( * ) Notice: Subject to any disclaimer, the term of this patent is extended or adjusted under 35 U.S.C. 154(b) by 625 days.

(21) Appl. No.: 17/128,198

(22) Filed: Dec. 21, 2020

(65) Prior Publication Data

US 2022/0136180 A1    May 5, 2022

(30) Foreign Application Priority Data

Oct. 29, 2020   (CN) .......................... 202022456677.X

(51) Int. Cl.
*E01C 9/08*   (2006.01)
*B60B 39/00*   (2006.01)

(52) U.S. Cl.
CPC ................ *E01C 9/08* (2013.01); *B60B 39/00* (2013.01)

(58) Field of Classification Search
CPC .................................. E01C 9/08; B60B 39/00
USPC ................................. 404/35; 14/69.5; 238/14
See application file for complete search history.

(56) References Cited

U.S. PATENT DOCUMENTS

| | | | |
|---|---|---|---|
| 3,836,075 A | 9/1974 | Botbol | |
| D348,240 S * | 6/1994 | Chiang | ........................ D12/608 |
| 5,538,183 A | 7/1996 | Mcgee | |
| 5,892,983 A * | 4/1999 | Tozaki | .................... G11B 27/10 |
| 6,520,420 B1 * | 2/2003 | Singh | ..................... B60B 39/12 |
| | | | 238/14 |
| D649,928 S * | 12/2011 | Cui | .............................. D12/400 |
| 9,775,326 B1 * | 10/2017 | MacNeil | ................ A01K 29/00 |
| 2008/0105215 A1* | 5/2008 | Simpson | ................ B65G 69/30 |
| | | | 119/849 |
| 2019/0150400 A1* | 5/2019 | Kumar | ................... B65G 69/30 |
| 2020/0307313 A1 | 10/2020 | Hadley et al. | |
| 2020/0308842 A1* | 10/2020 | Jakubowski | ......... A01K 15/027 |

FOREIGN PATENT DOCUMENTS

| | | |
|---|---|---|
| DE | 202020103565 U1 | 8/2020 |
| GB | 1027386 A | 4/1966 |
| JP | S4932334 U | 3/1974 |

OTHER PUBLICATIONS

First Office Action cited in corresponding patent application AU2020289757, dated Jul. 7, 2022, 7 pages.

* cited by examiner

*Primary Examiner* — Raymond W Addie
(74) *Attorney, Agent, or Firm* — COOPER LEGAL GROUP, LLC

(57) ABSTRACT

The present application discloses a vehicle rescue device, a rescue plate and a support plate, and relates to the field of cross-country equipment. The vehicle rescue device includes a first rescue plate and a second rescue plate, at least one end of the first rescue plate is provided with a first connecting portion, at least one end of the second rescue plate is provided with a second connecting portion, and the first connecting portion is detachably connected with the second connecting portion.

8 Claims, 12 Drawing Sheets

VEHICLE RESCUE DEVICE, RESCUE PLATE AND SUPPORT PLATE

CROSS-REFERENCE TO RELATED APPLICATION

The present application claims the priority benefits of China application serial No. 202022456677.X, filed on Oct. 29, 2020. The entirety of the above-mentioned patent application is incorporated herein by reference and made a part of this specification.

BACKGROUND

Technical Field

The present application relates to the field of cross-country equipment, in particular to a vehicle rescue device, a rescue plate and a support plate.

Description of Related Art

A rescue plate is regular cross-country equipment for a vehicle, and when the vehicle is trapped in a muddy road section and cannot move forward, the rescue plate is used for assisting the vehicle in escaping. When in use, the rescue plate is padded under a driving wheel of a vehicle so as to increase the friction force of the driving wheel to enable the trapped driving wheel in escaping from the sunken ground. Accordingly, the upper and lower end surfaces of the known rescue plate are provided with cleats or formed with a plurality of protrusions and recesses to provide a function of increasing the frictional force.

However, in practical use, when a vehicle has to cross over a sunken ground with a distance larger than the length of the rescue plate, a plurality of rescue plates usually have to be sequentially placed end to end to assist the vehicle in escaping, but in the practical use, due to poor continuity between the rescue plates, skidding phenomenon is likely to occur when wheels pass through the space between adjacent rescue plates, which increases the escaping difficulty, and prolongs the time required.

SUMMARY

The present application provides a vehicle rescue device, a rescue plate, and a support plate.

In a first aspect, the present application provides a vehicle rescue device, which adopts the following technical solutions.

A vehicle rescue device includes a first rescue plate and a second rescue plate. At least one end of the first rescue plate is provided with a first connecting portion, at least one end of the second rescue plate is provided with a second connecting portion, and the first connecting portion is detachably connected with the second connecting portion.

Preferably, the first connecting portion includes a connecting shaft connected to the first rescue plate, an axis direction of the connecting shaft extends along a width direction of the first rescue plate, the second connecting portion includes a connecting plate connected to the second rescue plate, the connecting plate is formed with a connecting groove through which the connecting shaft extends, one side of the connecting plate away from the second rescue plate is provided with an opening communicating with the connecting groove and having a width smaller than the diameter of the connecting groove, and the connecting shaft is detachably connected with the connecting plate.

By adopting the above technical solution, the first rescue plate and the second rescue plate can be connected by means of the connecting shaft and the connecting plate, and meanwhile, the overall length can be further increased by connecting the two first rescue plates at the two sides of the second rescue plate. Therefore, when it is necessary to assist vehicle in escaping from a continuous sunken ground or a deeper sunken ground, it is possible to choose to connect the first rescue plate and the second rescue plate to adapt to the application environment. Such a connecting manner can make the continuity of the vehicle rescue device better, and when the wheel passes through the joint of the first rescue plate and the second rescue plate, the skidding phenomenon does not easily occur. After the rescue plate is used, the first rescue plate and the second rescue plate can be detached again and conveniently stored, so that the storage space is saved. Meanwhile, by adopting the technical solution, the connecting shaft and the connecting groove are connected in a manner such that a hinged structure can be formed when the first rescue plate and the second rescue plate are connected, thereby avoiding rigid connection between the first rescue plate and the second rescue plate.

Preferably, the connecting plate includes limiting portions arranged on two sides of the opening of the connecting groove and extending along a direction away from the second rescue plate, and the first rescue plate is formed with a limiting groove through which the limiting portion extends.

By adopting the above technical solution, the limiting portion extends through the limiting groove, so that sliding of the connecting plate in the axis direction of the connecting shaft can be limited, and thereby the connecting strength of the first rescue plate and the second rescue plate is improved.

Preferably, an outer peripheral wall of the connecting shaft is provided with two access planes arranged in parallel, and a distance between the two access planes is less than or equal to the width of the opening.

By adopting the above technical solution, the access planes facilitate the connection between the connecting shaft and the connecting plate, reducing the difficulty for assembling them.

Preferably, an outer peripheral wall of the connecting shaft is formed with a relief groove in the axis direction of the connecting shaft, and the relief groove is arranged at the lower side of the connecting shaft.

By adopting the above technical solution, in the process of assisting the vehicle in escaping, the first rescue plate can make contact with the tires firstly, and then the first rescue plate can have the trend of moving downward relative to the second rescue plate. At this time, the pressure between the lower end surface of the connecting shaft and the connecting plate can be increased, thereby increasing the pressure borne by the joint of the connecting shaft and the first rescue plate. The relief groove is arranged such that portions on the two sides of the relief groove can approach each other under the guidance of arc guide surface on the outer side of the connecting shaft. When the tire is disengaged from the first rescue plate, the connecting shaft will restore to the original state, so that the connecting shaft can have a certain elasticity in the downward pressing process, thereby absorbing part of the energy and improving the overall connection strength.

Preferably, the first rescue plate includes a fixing plate to which a connecting shaft is connected, and the fixing plate is inclined upward in an extension direction away from the connecting shaft.

By adopting the above technical solution, when the joint of the first rescue plate and the second rescue plate is pressed, when the joint of the first rescue plate and the second rescue plate is pressed, the two sides of the first rescue plate and the second rescue plate away from each other are raised upward. Such an arrangement allows a vacancy to be formed above the connecting shaft, thereby increasing the rotating angle of the first rescue plate and the second rescue plate, and improving the pressure borne by the joint to a certain extent.

Preferably, the first rescue plate and the second rescue plate are each provided with anti-skid protrusions in an array mode, and connecting grooves through which the anti-skid protrusions extends are formed between four adjacent anti-skid protrusions.

By adopting the above technical solution, when the second rescue plate is detached from the first rescue plate, the second rescue plate can be connected to the first rescue plate in a limiting manner, which avoids relative sliding of the first rescue plate and the second rescue plate during stacking, and facilitates storage and arrangement.

Preferably, a receiving groove for receiving a bottom portion of a support device is formed on an end surface of the second rescue plate away from the anti-skid protrusions.

By adopting the above technical solution, the receiving groove is arranged such that the bottom portion of the support device can be received on the second rescue plate, the contact area between the support device and the ground is increased, and thereby the pressure intensity exerted by the support device on the ground when in use is reduced, and therefore, the support device is suitable for application occasions with depressions and loose ground surfaces.

In a second aspect, the present application provides a rescue plate, which adopts the following technical solutions.

The rescue plate includes a first rescue plate. At least one end of the first rescue plate is provided with a connecting shaft, and the axis direction of the connecting shaft extends along the width direction of the first rescue plate.

In a third aspect, the present application provides a support plate, which adopts the following technical solutions.

The support plate includes a second rescue plate. At least one end of the second rescue plate is provided with a connecting plate, the connecting plate is formed with a connecting groove through which a connecting shaft of the rescue plate extends, and one side of the connecting plate away from the second rescue plate is provided with an opening communicating with the connecting groove.

To make the aforementioned more comprehensible, several embodiments accompanied with drawings are described in detail as follows.

DESCRIPTION OF THE EMBODIMENTS

Terms used for describing the present application, such as "upper", "lower", "left", "right", "vertical", and "horizontal", show orientation or position relationship based on the accompanying drawings, are only used to simplify description of the present application, and do not indicate or imply that the portions referred to must have a particular orientation, or be configured and operated in a particular orientation, and thus do not to be construed as limiting the present application.

The present application is described in detail hereinafter with reference to FIG. 1-FIG. 12.

Embodiment 1

Figure 1:
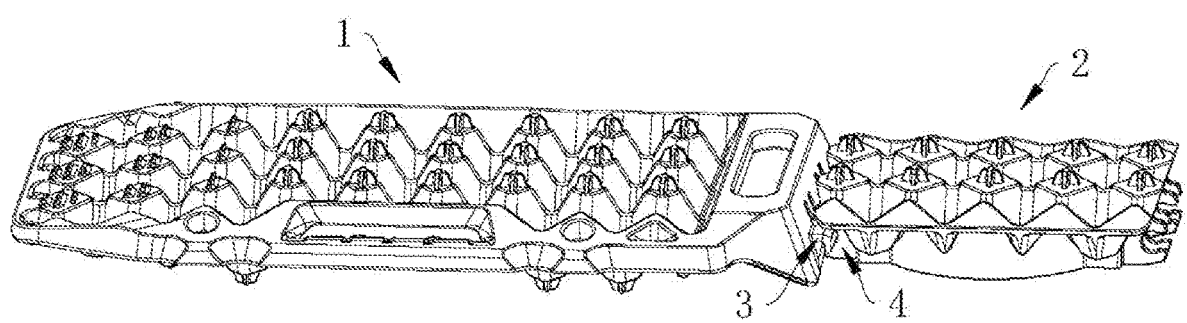
FIG. 1 is a structural schematic diagram of a vehicle rescue device according to Embodiment 1 of the present application.

Embodiment 1 of the present application discloses a vehicle rescue device. Referring to FIG. 1, the vehicle rescue device includes a first rescue plate 1 and a second rescue plate 2 connected to the first rescue plate 1. At least one end of the first rescue plate 1 is provided with a first connecting portion 3, at least one end of the second rescue plate 2 is provided with a second connecting portion 4, and the first connecting portion 3 is detachably connected to the second connecting portion 4. When both ends of the second rescue plate 2 are provided with the second connecting portion 4, both ends of the second rescue plate 2 can be connected to the first rescue plate 1.

Figure 2:
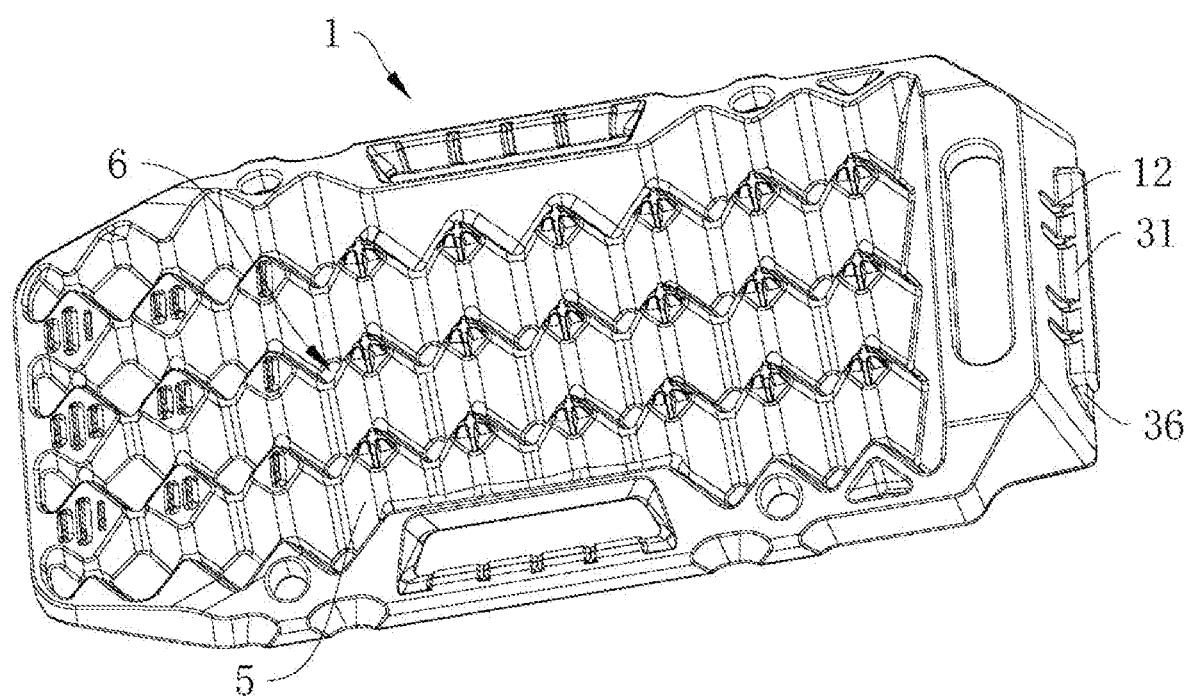
FIG. 2 is a schematic structural diagram of a first rescue plate according to Embodiment 1 of the present application.
Figure 3:
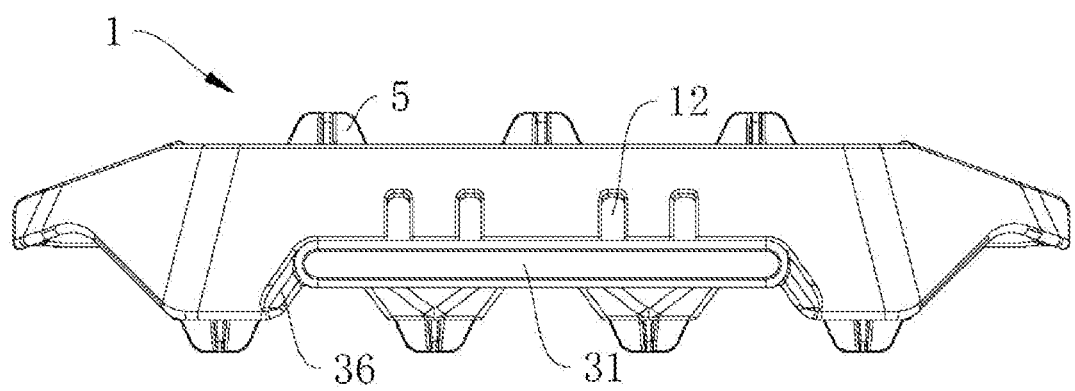
FIG. 3 is a side view of a first rescue plate according to Embodiment 1 of the present application.

Referring to FIG. 2 and FIG. 3, the first connecting portion 3 includes a connecting shaft 31 connected to the first rescue plate 1, an axis direction of the connecting shaft 31 extends along a width direction of the first rescue plate 1. In particular, the connecting shaft 31 is integrally formed with the first rescue plate 1. Two ends of the connecting shaft 31 are provided with reinforcing ribs 36 connected to the first rescue plate 1, and taking the direction in FIG. 3 as an example, the reinforcing ribs 36 are inclined in a direction away from the connecting shaft 31 from top to bottom.

Figure 4:
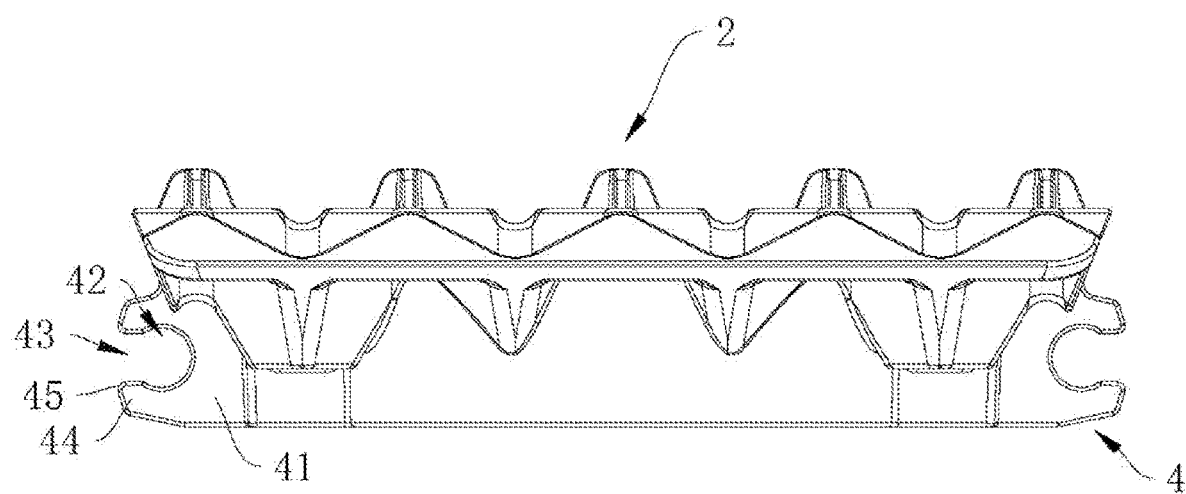
FIG. 4 is a front view of a second rescue plate according to Embodiment 1 of the present application.

Referring to FIG. 4, the second connecting portion 4 includes a connecting plate 41 connected to the second rescue plate 2, the connecting plate 41 is formed with a connecting groove 42 through which the connecting shaft 31 extends, and the connecting groove 42 is integrally formed with the second rescue plate 2. One side of the connecting plate 41 away from the second rescue plate 2 is provided with an opening 43 communicating with the connecting groove 42, and the width of the opening 43 is smaller than the diameter of the connecting groove 42, so that a cross section of a groove wall of the connecting groove 42 is formed as a major arc. At the same time, it should be noted that the diameter of the connecting shaft 31 should also be greater than the width of the opening 43 to achieve the purpose of hinged connection between the first connecting portion 3 and the second connecting portion 4.

In particular, the first connecting portion 3 and the second connecting portion 4 can be fixed in a plurality of connecting manners. In one embodiment, the connecting shaft 31 is brought into abut against the opening 43 on the connecting plate 41, and is pressed by a force to deform the connecting plate 41, so that the width of the opening 43 is increased to allow the connecting shaft 31 to pass therethrough. When the connecting shaft 31 is inserted into the connecting groove 42, the connecting plate 41 restored from the deformation to limit the connecting shaft 31.

Figure 5:
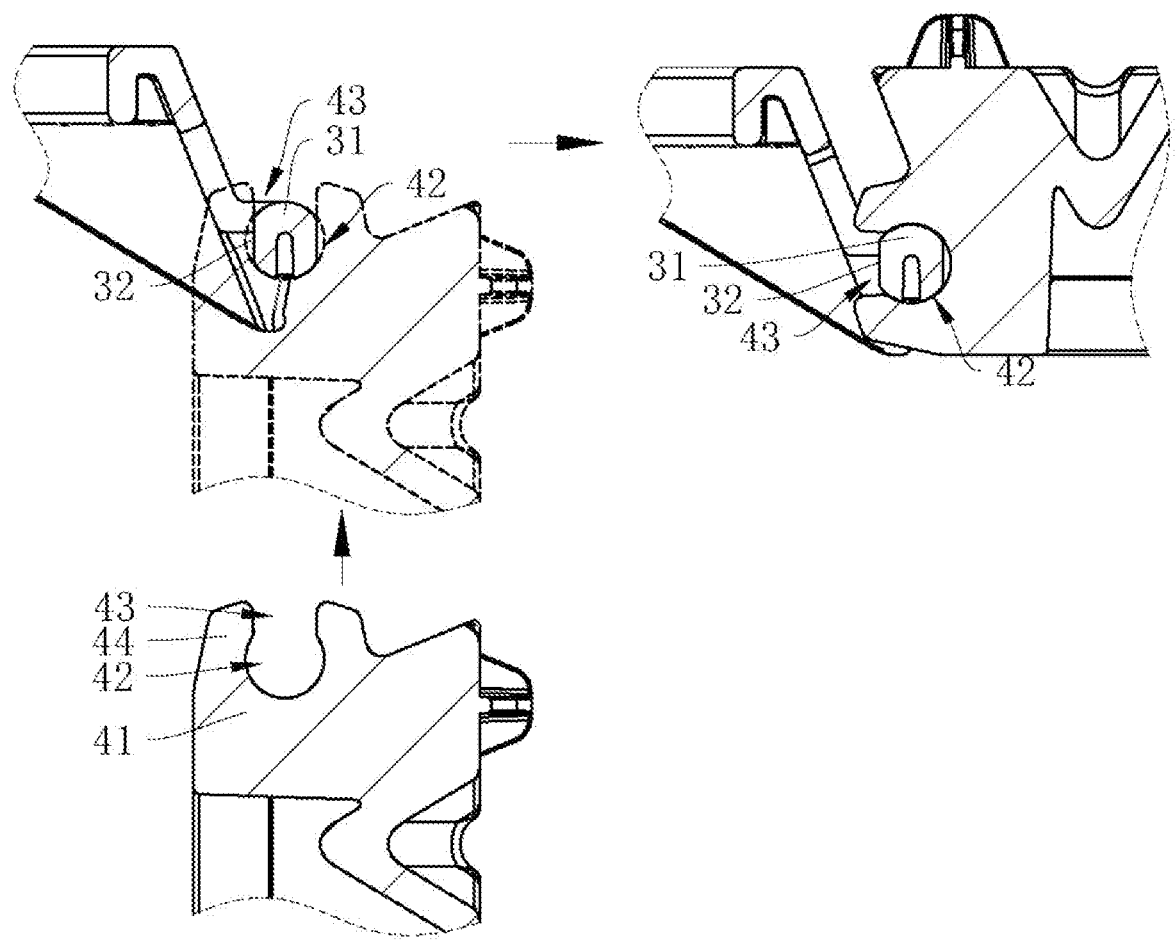
FIG. 5 is a schematic diagram of illustrating the assembly process of a first rescue plate and a second rescue plate according to Embodiment 1 of the present application.

Referring to FIG. 5, in another embodiment, an outer peripheral wall of the connecting shaft 31 is provided with two access planes 32 arranged in parallel. When the first rescue plate 1 is laid flat on the horizontal ground, the access planes 32 are arranged perpendicularly to the horizontal ground, and the distance between the two access planes 32 needs to be less than or equal to the width of the opening 43 on the connecting plate 41.

During the assembling process in this embodiment, the opening 43 on the connecting plate 41 are firstly arranged upward (i.e. the second rescue plate 2 and the first rescue plate 1 are arranged perpendicularly to each other), and the connecting shaft 31 is inserted into the connecting groove 42 along an extending direction from the connecting groove 42 to the opening 43 under the action of the two access planes 32. When the connecting shaft 31 is inserted into the connecting groove 42, the first rescue plate 1 or the second rescue plate 2 is rotated relative to one another, so that the two access planes 32 and the openings 43 can be staggered, and the connecting shaft 31 and the connecting plate 41 can form a limiting structure to prevent the connecting shaft 31 from disengaging from the connecting plate 41. In such an assembling manner, assembling can be achieved without deformation of the connecting plate 41 or the connecting shaft 31, so that the service life of the joint is prolonged, and the stability after connection is better. Meanwhile, the assembling difficulty is low and the efficiency is higher.

Figure 6:
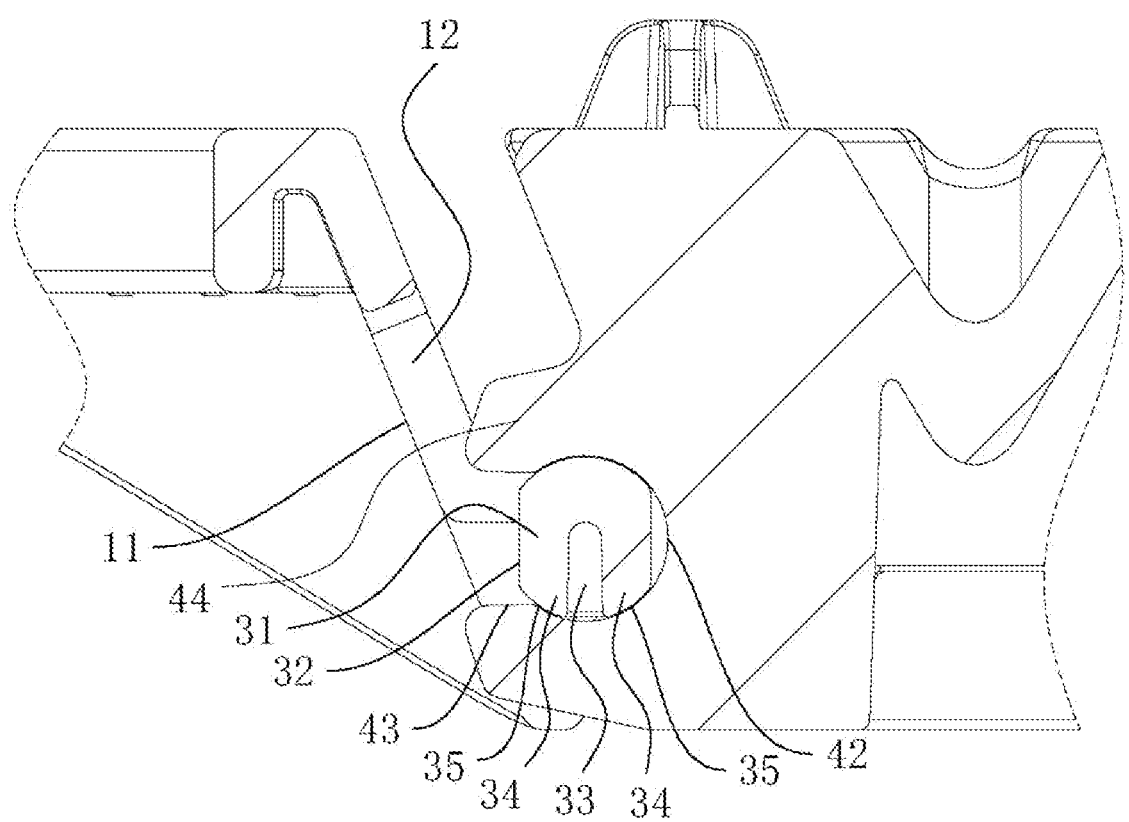
FIG. 6 is a sectional view of a joint of a first rescue plate and a second rescue plate according to Embodiment 1 of the present application.

Referring to FIG. 6, further, the outer peripheral wall of the connecting shaft 31 is provided with a relief groove 33 in the axis direction of the connecting shaft 31, and the relief groove 33 is arranged at the lower side of the connecting shaft 31. In particular, two sides of the relief groove 33 are defined as two elastic portions 34, and when the first rescue plate 1 is pressed, the lower side of the connecting shaft 31 abuts against the lower groove wall of the connecting groove 42. Since the outer periphery of the connecting groove 42 is an arc surface, two arc guide surfaces 35 with opposite inclination are formed below the two elastic portions 34, and under the action of the arc groove wall of the connecting groove 42, the elastic portions 34 on the two sides are deformed, so that the lower ends of the elastic portions 34 on the two sides approach each other in the pressing process of the connecting shaft 31. In this arrangement, a portion of the stresses at the joint of the connecting shaft 31 and the first rescue plate 1 can be shared by the deformation of the elastic portion 34, thereby improving the overall structural strength, and reducing the risk of breakage between the connecting shaft 31 and the first rescue plate 1.

Referring to FIG. 4 and FIG. 6, in order to prevent relative sliding between the first connecting portion 3 and the second connecting portion 4, the connecting plate 41 includes limiting portions 44 arranged on the two sides of the opening 43 of the connecting groove 42 and extending along a direction away from the second rescue plate 2. The distance between the limiting portions 44 on the two sides gradually increases in a direction away from the connecting groove 42. Meanwhile, the limiting portion 44 is provided with an arc transition surface 45 near the top corner of the opening 43. Correspondingly, the first rescue plate 1 includes a fixing plate 11 for connecting the connecting shaft 31, taking the direction shown in FIG. 6 as an example, the fixing plate 11 is inclined upward in an extending direction away from the connecting shaft 31 (i.e. extending leftward), and the fixing plate 11 is formed with a limiting groove 12 through which the limiting portion 44 extends. It should be noted that, when the first fixing plate 11 and the second fixing plate 11 are placed horizontally, the limiting portion 44 at the upper end extends through the limiting groove 12 to prevent relative sliding between the connecting plate 41 and the axis of the connecting shaft 31. It should be noted that, the number of the connecting plates 41 and the number of the limiting grooves 12 can be selected according to actual situations, which are not described herein again.

In particular, the inclined fixing plate 11 makes the upper end of the fixing plate 11 form a certain escape space, so that one end of the first rescue plate 1 away from the connecting shaft 31 and one end of the second rescue plate 2 away from the connecting plate 41 can both be raised upward with respect to the joint of the first rescue plate 1 and the second rescue plate 2.

Figure 7:
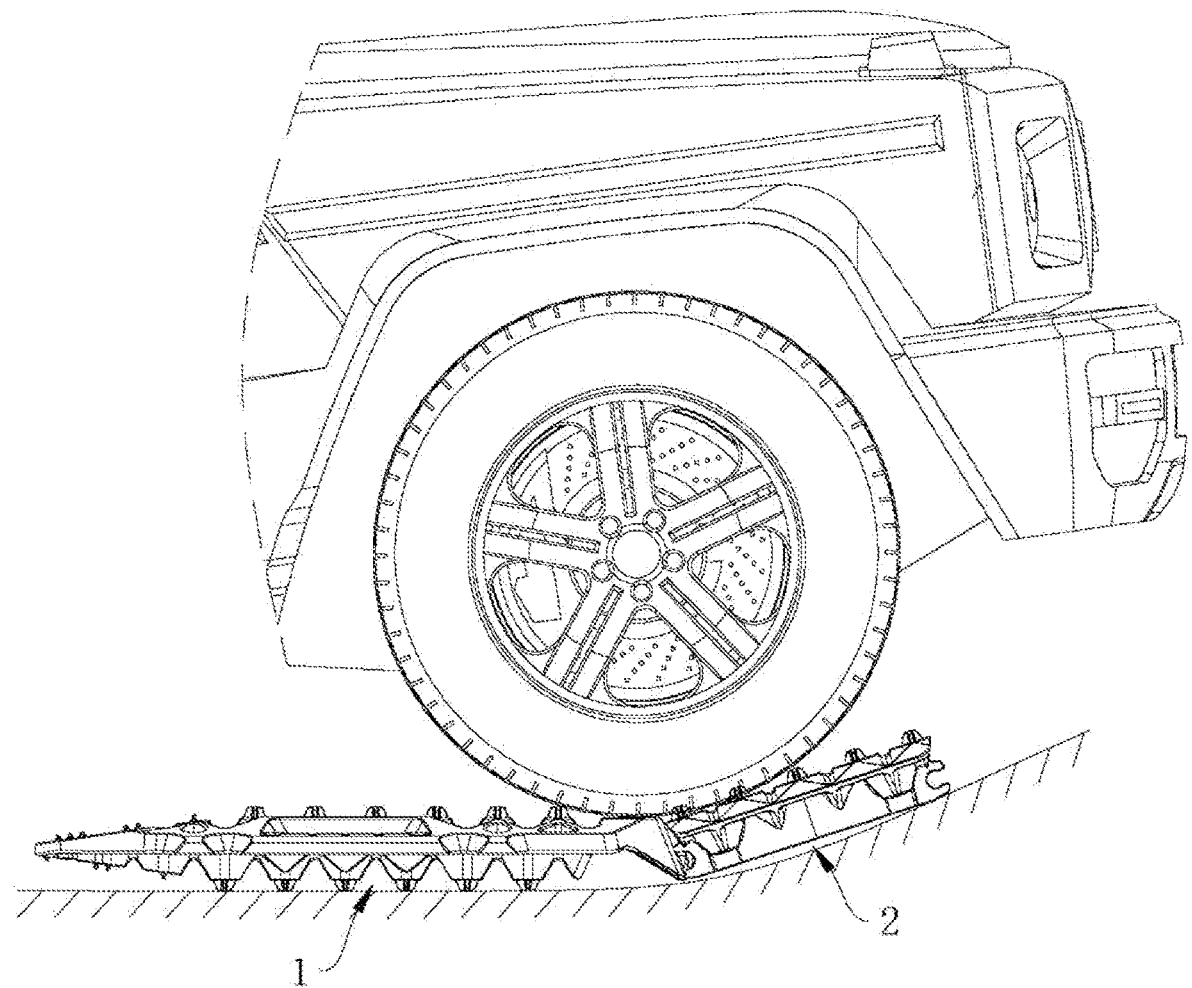
FIG. 7 is a schematic diagram illustrating a state in which a tire of an automobile travels to a joint of a first rescue plate and a second rescue plate according to Embodiment 1 of the present application.

Referring to FIG. 7, in practical use, if the vehicle rescue device encounters some road sections with deeper sunken ground, the vehicle rescue device in such a bending manner can be more fit to the radian of the sunken ground. Compared to a rescue plate that cannot adopt such a bending manner, the rescue plate disclosed in the present application has a smaller deflection of deformation when assisting the vehicle in escaping, thereby reducing the risk of bending fracture of the rescue plate, and effectively improving the overall structural strength.

An implementation principle of a vehicle rescue device according to this embodiment of the present application is as follows. When it is necessary to assist vehicle in escaping from a continuous sunken ground or a deeper sunken ground, it is possible to choose to connect the first rescue plate 1 and the second rescue plate 2 to adapt to the application environment. Such a connecting manner can make the continuity of the vehicle rescue device better, and when the wheel passes through the joint of the first rescue plate 1 and the second rescue plate 2, the skidding phenomenon does not easily occur.

Embodiment 2

On the basis of Embodiment 1, the first rescue plate 1 and the second rescue plate 2 can further provide the function of supporting the base of the support device.

Figure 8:
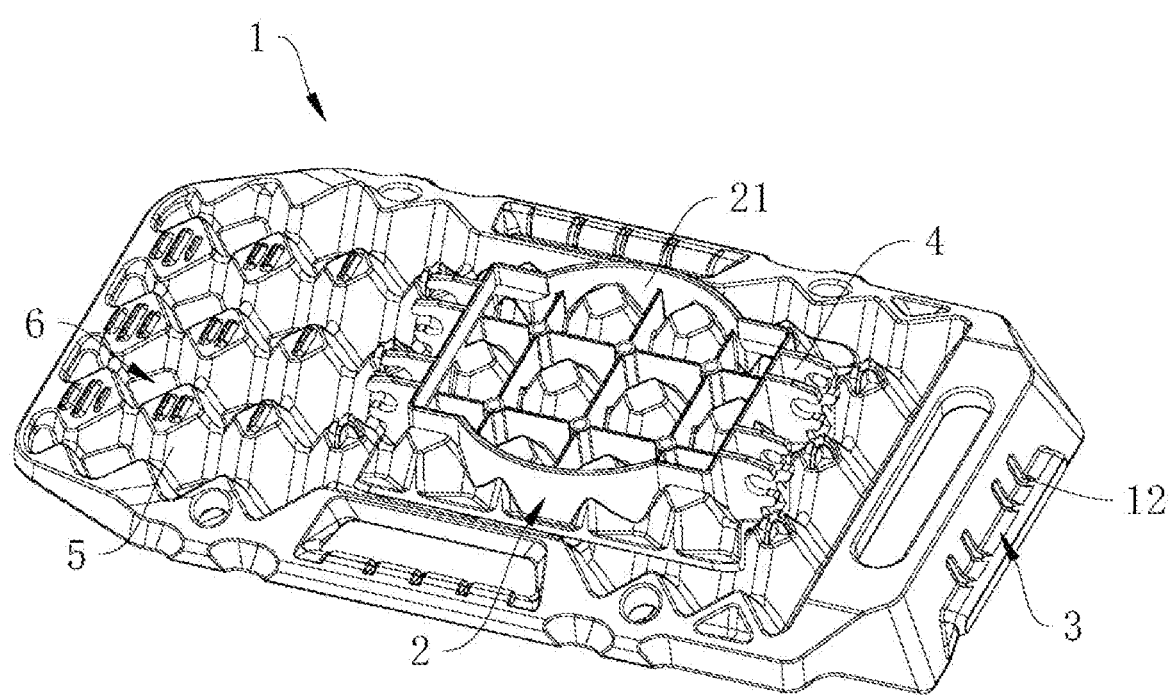
FIG. 8 is a structural schematic diagram of a vehicle rescue device for supporting a support device according to Embodiment 2 of the present application.
Figure 9:
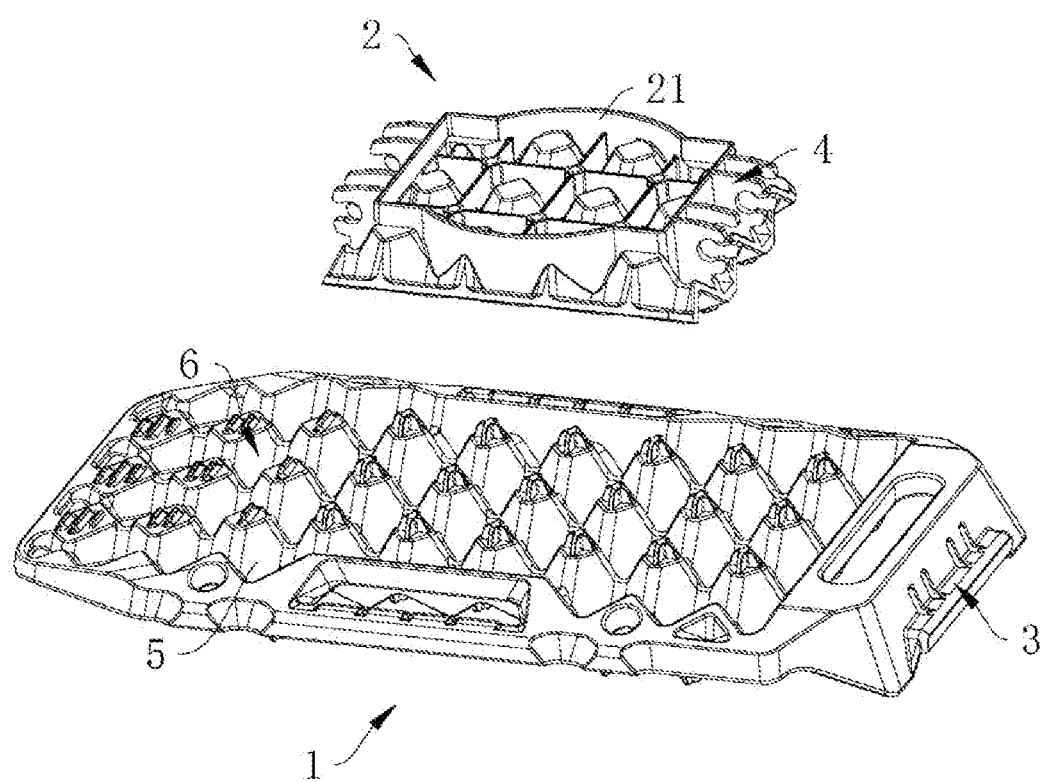
FIG. 9 is an exploded schematic diagram in the state of FIG. 8.

Referring to FIG. 8 and FIG. 9, specifically, the first rescue plate 1 and the second rescue plate 2 are each provided with anti-skid protrusions 5 in an array mode, and connecting groove 6 through which the anti-skid protrusions 5 extends are formed between four adjacent anti-skid protrusions 5. In particular, the anti-skid protrusion 5 is arranged in a quadrangular pyramidal shape in this embodiment, and the connecting groove 6 formed correspondingly is also in a quadrangular pyramidal shape. When the first connecting portion 3 and the second connecting portion 4 are detached and separated from each other, the second rescue plate 2 can be stacked on the first rescue plate 1 to insert the anti-skid protrusion 5 on the first rescue plate 1 into the connecting groove 6 on the second rescue plate 2. Meanwhile, the anti-skid protrusion 5 on the second rescue plate 2 may also be correspondingly inserted into the connecting groove 6 on the first rescue plate 1, thereby connecting the first rescue plate 1 and the second rescue plate 2 with each other in a limiting manner.

Further, a receiving groove 21 for receiving and limiting a bottom portion of the support device is arranged on an end surface of the second rescue plate 2 away from the anti-skid protrusion 5. Therefore, in the process that the first rescue plate 1 and the second rescue plate 2 are stacked, the receiving groove 21 can be arranged in a direction away from the first rescue plate 1, and the stacked first rescue plate 1 and the second rescue plate 2 are integrally arranged as a base for supporting the support device. However, the second rescue plate 2 can also be used alone, and when the end surface of the second rescue plate 2 provided with the anti-skid protrusion 5 is arranged downward, the second rescue plate 2 can make contact with the ground to improve the anti-skid and anti-sinking effects. In particular, the support device can be an escape device, such as a vehicle jack and an off-road jack, which is commonly used by off-road vehicles, is used for assisting in lifting the vehicle and escaping the vehicle from the ground.

An implementation principle of a vehicle rescue device according to an embodiment of the present application is. When it is necessary to use a support device, the first rescue plate 1 and the second rescue plate 2 can be stacked and placed on the ground. Then, the base of the support device is received in the receiving groove 21 on the second rescue plate 2. In this way, the contact area between the base of the support device and the ground is increased, which reduces the occurrence of skidding or sinking, and is more suitable for muddy road sections and relatively soft road sections.

Embodiment 3

Figure 10:
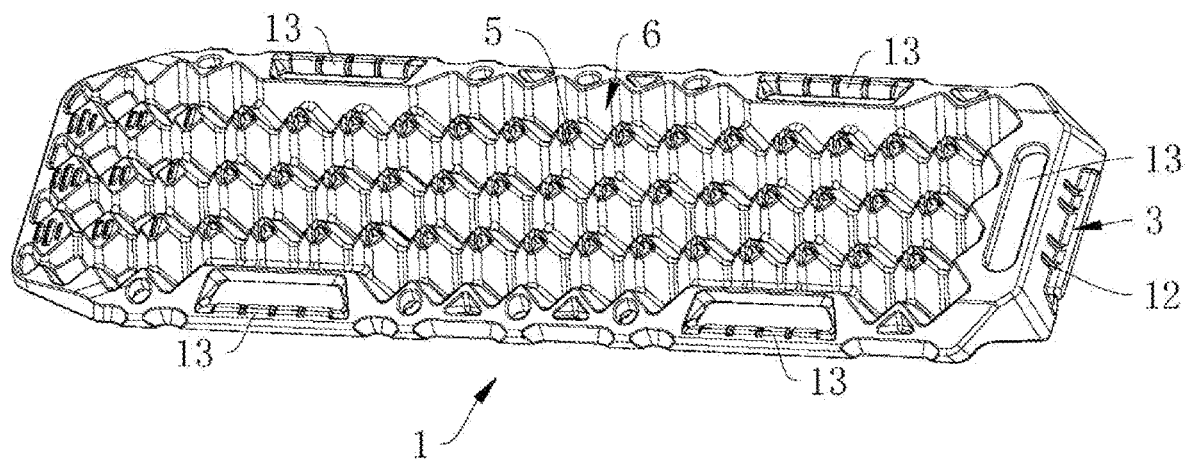
FIG. 10 is a structural schematic diagram of a rescue plate according to Embodiment 3 of the present application.

Referring to FIG. 10, Embodiment 3 of the present application discloses a rescue plate, which includes a first rescue plate 1 as described in Embodiment 2 and a first connecting portion 3 provided on the first rescue plate 1. In particular, the number of the first connecting portion 3 is one, and the first connecting portion 3 is arranged at one end of the first rescue plate 1. One end of the first rescue plate 1 close to the first connecting portion 3 and two sides adjacent to the first connecting portion 3 are provided with a grip 13 for a user to grip, so that the whole rescue plate can also serve as a shovel plate for use.

Meanwhile, it should be noted that the connecting groove 6 extends toward the other end surface of the first rescue plate 1, and the anti-skid protrusion 5 is also formed on the other end surface of the first rescue plate 1.

Embodiment 4

Figure 11:
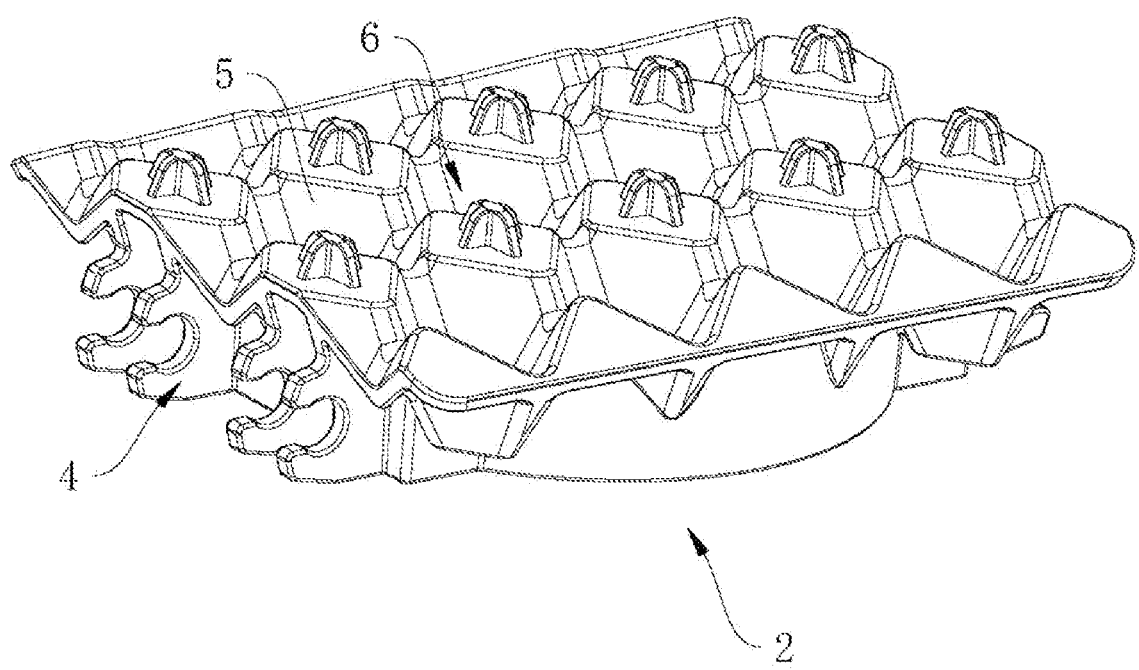
FIG. 11 is a structural schematic diagram of a support plate according to Embodiment 4 of the present application.
Figure 12:
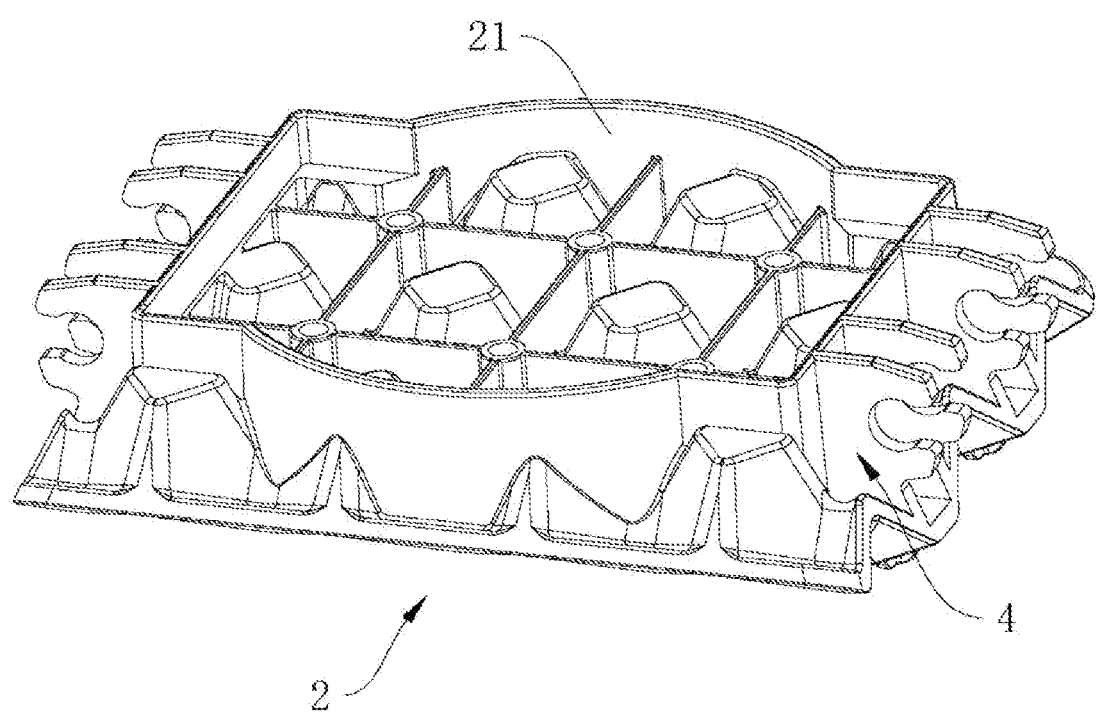
FIG. 12 is another schematic structural diagram of a support plate according to Embodiment 4 of the present application.

Referring to FIG. 11 and FIG. 12, Embodiment 4 of the present application discloses a support plate, which includes the second rescue plate 2 as described in Embodiment 2 and a second connecting portion 4 arranged on the second rescue plate 2. In particular, the number of the second connecting portion 4 is two, and two second connecting portions 4 are arranged at two opposite ends of the second rescue plate 2. The second rescue plate 2 is provided with a receiving groove 21 for receiving and limiting the bottom of the support device, at an end surface of the second rescue plate 2 away from the anti-skid protrusion 5. When in use, the end surface provided with the anti-skid protrusion 5 can be arranged downward to act as a support base of the support device.

The above description is only preferred embodiments of the present application and is not intended to limit the protection scope of the present application. Therefore, all equivalent changes of the structure, shape or principle according to the spirit of the present application should be all included in the protection scope of the present application.

What is claimed is:

1. A vehicle rescue device, comprising a first rescue plate and a second rescue plate, wherein,
    at least one end of the first rescue plate is provided with a first connecting portion,
    at least one end of the second rescue plate is provided with a second connecting portion,
    the first connecting portion is detachably connected with the second connecting portion,
    the first connecting portion comprises a connecting shaft connected to the first rescue plate,
    the second connecting portion comprises a connecting plate connected to the second rescue plate,
    one side of the connecting plate away from the second rescue plate is provided with an opening,
    an outer peripheral wall of the connecting shaft is provided with two access planes arranged in parallel, and
    a distance between the two access planes is less than or equal to a width of the opening.

2. The vehicle rescue device according to claim 1, wherein,
    the outer peripheral wall of the connecting shaft is formed with a relief groove in an axial direction of the connecting shaft, and the relief groove is arranged at a lower side of the connecting shaft.

3. The vehicle rescue device according to claim 1, wherein,
    an axial direction of the connecting shaft extends along a width direction of the first rescue plate,
    the connecting plate is formed with a connecting groove through which the connecting shaft extends,
    the opening communicates with the connecting groove and the width of the opening is smaller than a diameter of the connecting groove, and
    the connecting shaft is detachably connected with the connecting plate.

4. The vehicle rescue device according to claim 3, wherein,
    the connecting plate comprises limiting portions arranged on two sides of the opening of the connecting groove and extending along a direction away from the second rescue plate, and
    the first rescue plate is formed with limiting grooves through which the limiting portions extend.

5. The vehicle rescue device according to claim 3, wherein,
    the first rescue plate comprises a fixing plate to which the connecting shaft is connected, and the fixing plate is inclined upward in an extension direction away from the connecting shaft.

6. The vehicle rescue device according to claim 3, wherein, the first rescue plate and the second rescue plate are each provided with anti-skid protrusions in an array mode, and connecting grooves through which the anti-skid protrusions extend are formed between four adjacent anti-skid protrusions of the anti-skid protrusions.

7. The vehicle rescue device according to claim 6, wherein, a receiving groove for receiving a bottom portion of a support device is formed on an end surface of the second rescue plate away from the anti-skid protrusions.

8. A rescue plate, comprising a first rescue plate, wherein, at least one end of the first rescue plate is provided with a connecting shaft, and an axial direction of the connecting shaft extends along a width direction of the first rescue plate, the at least one end of the first rescue plate is provided with a first connecting portion, the first connecting portion comprises the connecting shaft connected to the first rescue plate, an outer peripheral wall of the connecting shaft is provided with two access planes arranged in parallel, and a distance between the two access planes is less than or equal to a width of an opening of a connecting plate of a second connecting portion of a second rescue plate.

* * * * *